United States Patent [19]

Iwasaki

[11] Patent Number: 5,645,657
[45] Date of Patent: Jul. 8, 1997

[54] PNEUMATIC TIRE INCLUDING CENTRAL PART

[75] Inventor: Naoaki Iwasaki, Kobe, Japan

[73] Assignee: Sumitomo Rubber Industries, Ltd., Hyogo-ken, Japan

[21] Appl. No.: 419,938

[22] Filed: Apr. 11, 1995

[30] Foreign Application Priority Data

Apr. 15, 1994 [JP] Japan ................... 6-101833

[51] Int. Cl.$^6$ ............... B60C 11/04; B60C 11/00
[52] U.S. Cl. ............ 152/209 A; 152/424; 152/456
[58] Field of Search ............ 152/209 R, 209 A, 152/209 D, 454, 455, 456

[56] References Cited

U.S. PATENT DOCUMENTS

| | | | |
|---|---|---|---|
| D. 347,816 | 6/1994 | Maxwell et al. | D12/147 |
| 4,044,810 | 8/1977 | Taniguchi et al. | |
| 4,173,991 | 11/1979 | Mirtain | 152/209 D |
| 4,635,694 | 1/1987 | Hosokawa | 152/209 A |
| 5,329,980 | 7/1994 | Swift et al. | 152/209 A |
| 5,337,815 | 8/1994 | Graas | 152/209 R |

FOREIGN PATENT DOCUMENTS 0593288  4/1994  European Pat. Off. .
2484336  12/1981  France .

OTHER PUBLICATIONS

Patent Abstracts of Japan; vol. 15 No. 468; Nov. 27, 1991 JP3200405 (Bridgestone Corp.), Sep. 2, 1991.
Patent Abstracts of Japan; vol. 15 No. 475; Mar. 12, 1991 JP3204308 (Bridgestone Corp.), Sep. 5, 1991.

*Primary Examiner*—Steven D. Maki
*Attorney, Agent, or Firm*—Birch, Stewart, Kolasch & Birch, LLP

[57] ABSTRACT

A pneumatic tire has a tread part with two wide circumferential grooves having a width GW of not less than 35 mm and not more than the ground-contacting width TW of the tread with one circumferential groove extending on each side of the tire's equator so as to divide the tread part into a pair of shoulder parts and a central part. The central part has a surface utilizing successive convex curves of a pair of inner groove walls and a central ground-contacting surface. The central ground-contacting surface is substantially in contact with a virtual tread line between outer surfaces of the shoulder parts, and the surface of the central part is asymmetrical about the tire equatorial plane CL.

9 Claims, 17 Drawing Sheets

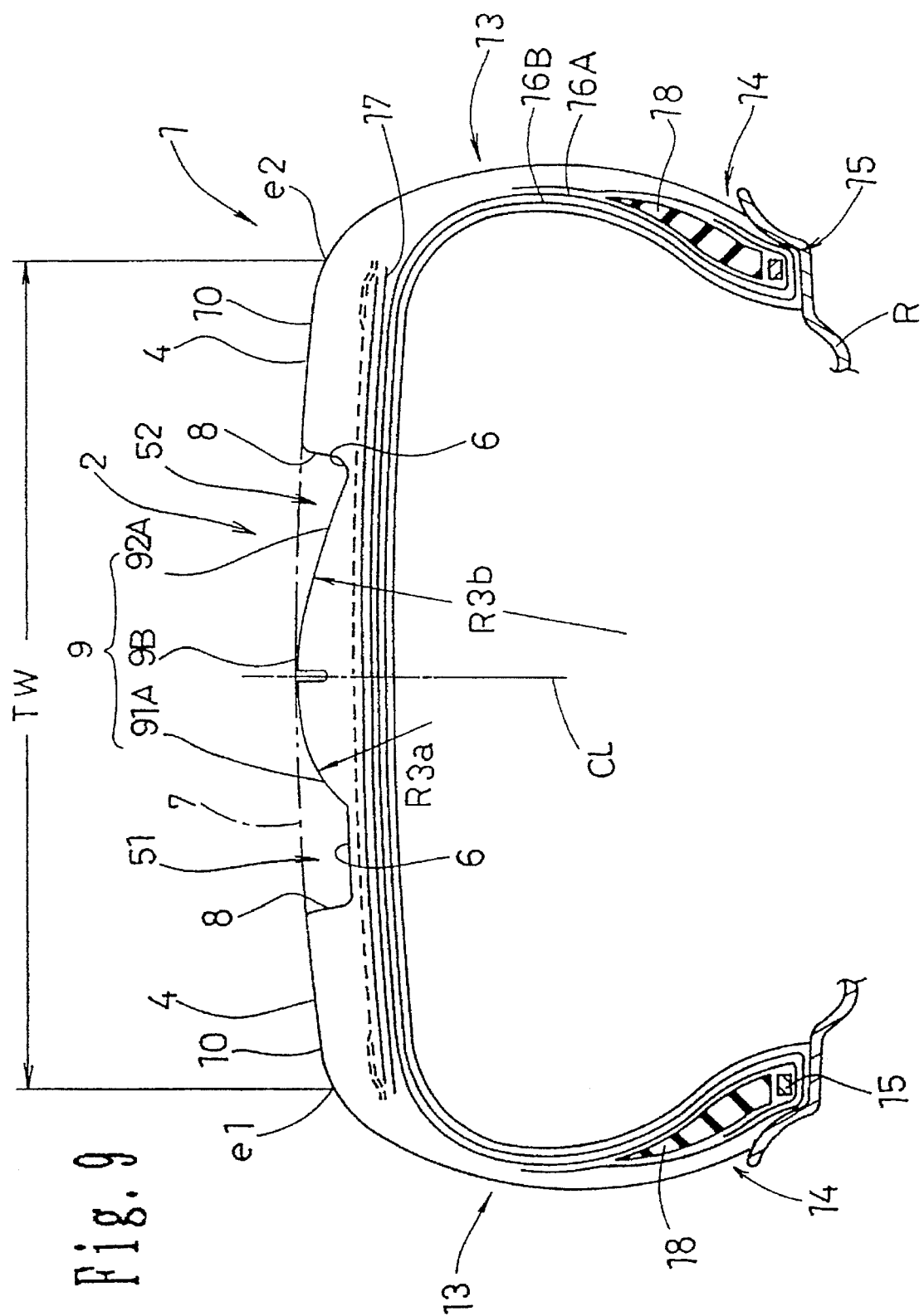

5,645,657

1

PNEUMATIC TIRE INCLUDING CENTRAL PART

BACKGROUND OF THE INVENTION

The present invention relates to a pneumatic tire, particularly a low aspect radial tire for passenger vehicles, capable of reconciling improvement of wet grip performance such as hydroplaning resistance and reduction of tire noise.

FIELD OF THE INVENTION

Recently, as automobiles become quieter tire noise has come to contribute at a higher ratio to the total noise level of an automobile, and its reduction is demanded. Such noise reduction is specifically desired in a range around 1 kHz which forms the peak frequency of tire noise, and sounds due to a columnar resonance generated by the circumferential grooves is one of the main sound sources in such high frequency range.

On the other hand, in order to maintain the wet grip performance, the tread of tire is generally provided with plural circumferential grooves continuously extending in the circumferential direction of tire.

In such a tire, when it is in contact with the ground, a kind of air column is formed by the road surface and the circumferential groove. Then a sound of specific wavelength, which is double the wave length of the air column is caused by airflow within the column during running.

Such a phenomenon is referred to as a columnar resonance, and provides the main source of noise at 800 to 1.2 kHz. The wavelength of the columnar resonance sound is approximately constant to give a constant frequency regardless of the tire's speed, and then increases sound inside and outside an automobile. Incidentally, since this noise around 1 khz is a sound easily heard by the human ear, the increase of noise with this frequency greatly influences tire noise performance.

In order to prevent the columnar resonance, although reduction of the number or volume of the circumferential grooves is known, such reductions lead to a lower wet grip performance.

On the other hand, although the wet grip performance can be increased contrarily by increasing the number or volume of circumferential grooves, a simple increase causes reduction of the dry grip performance, because the ground-contact area is reduced. Also, this causes a reduction of steering stability as the rigidity of tread pattern is reduced, in addition to the increase in tire noise.

Conventionally, a tire's performances have been adjusted by sacrificing one or more performances factors.

SUMMARY OF THE INVENTION

It is hence a primary object of the invention to provide a pneumatic tire capable of reconciling improvement of wet grip performance such as hydroplaning resistance and reduction of tire noise without loss of dry grip performance or steering stability.

According to one aspect of the present invention, a pneumatic tire comprising a tread part having two circumferential grooves continuously extending in the circumferential direction in opposite sides of the tire's equator so as to divide the tread part into a pair of shoulder parts, which are located outside outer bottom edges of the circumferential grooves in the axial direction of tire, and a central part, which is located between inner bottom edges of the circumferential grooves in the axial direction of tire; wherein

2 the central part has a surface comprising successive convex curves composed of a pair of inner groove walls extending inside, in the axial direction of tire, along a curve convex outwardly in the radial direction from the inner bottom edges of the circumferential grooves and a central ground-contacting surface smoothly connected between the pair of the inner groove walls, the central ground-contacting surface is substantially in contact with a virtual tread line between outer surfaces of the shoulder parts, the surface of the central part is asymmetrical about the tire equatorial plane CL, and when the tire is mounted on a regular rim, inflated with regular internal pressure and applied with normal load, the circumferential grooves have a groove width GW being not less than 3.5 mm and not more than 0.35 times a ground-contacting width TW of the tread.

A bisectional plane KL dividing the central part in two equal widths in the axial direction of tire may be coincident with or remote from the tire equatorial plane CL.

BRIEF DESCRIPTION OF THE DRAWINGS

An embodiment of the present invention will now be described, by way of example, referring to the attached diagrammatic drawings, in which:

FIG. 9 is a sectional view of a tire showing another example.

DETAILED DESCRIPTION OF THE INVENTION

Figure 1:
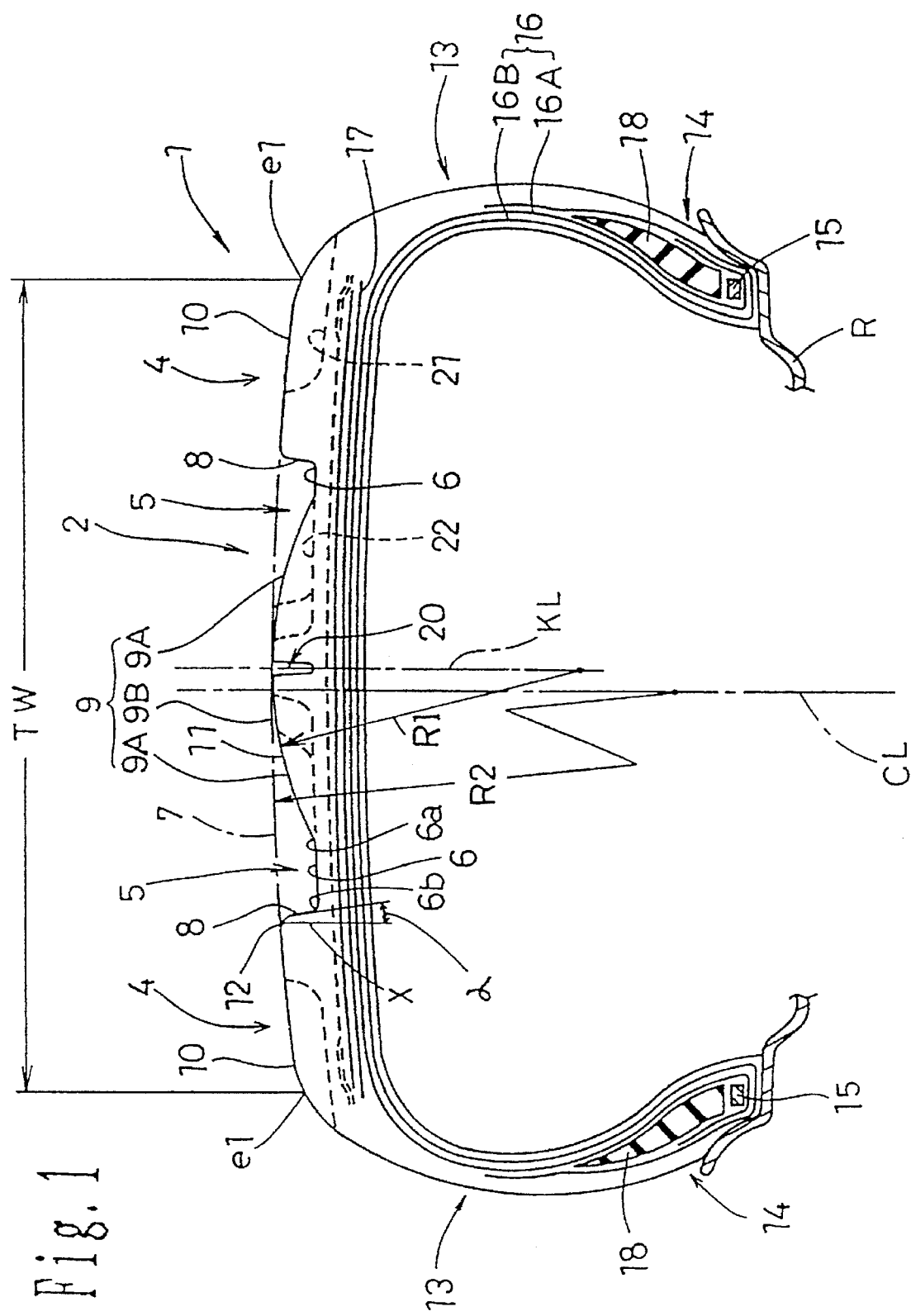
FIG. 1 is a sectional view showing an embodiment of the invention.

FIG. 1 shows a tire 1 of the invention in its normal state mounted on its regular rim R and inflated with regular internal pressure. The regular rim is the rim officially approved for the tire by for example, JATMA (Japan), TRA (USA), ETRTO (Europe) and the like; the regular internal pressure is the maximum air pressure for the tire officially specified in Air-pressure/Max.-loads Table by for example JATMA, TRA, ETRTO and the like; and a normal load is the maximum load for the tire officially specified in Air-pressure/Max.-loads Table by for example JATMA, TRA, ETRTO and the like.

The tire 1 comprises a pair of bead parts 14 each having a bead core 15, sidewall parts 18 extending from the bead parts 14 outwardly in the radial direction of tire, and a tread part 2 linking their outer ends. The aspect ratio is between 0.4 and 0.6 to provide low aspect tire for passenger vehicles. (Aspect ratio =sectional height/tire width.)

A radial carcass 16 comprising two plies 16A, 16B extends between the bead parts 14. The both edges of the carcass 16 are folded back from inside to outside one around the bead core 15, and a belt layer 17 is provided above the carcass 16 and radially inwards of the tread part 2.

In addition, a rubber bead apex 18 extending radially outward from each bead core 15 is provided between the main part of the carcass 16 and the folded back part thereof so as to maintain the shape and rigidity of the bead part 14.

The belt layer 17 comprises plural belt plies of cords aligned at an angle of 15 to 30 degrees to the tire equator and coated by a topping rubber. The belt cords have a high tensile strength, such as steel or aromatic polyamide, and are arranged to cross to each other between the belt plies. For the carcass cords, in the case of a tire for passenger vehicles, such organic fiber cords as nylon, rayon and polyester may be generally employed.

The tread part 2 has two wide circumferential grooves 5, 5 which are positioned one at either side of the tire's equator and then continuously extend substantially in the circumferential direction, so that the tread part 2 is divided into a pair of shoulder parts 4, 4 and a central part 9. The shoulder parts 4, 4 are defined as the regions outside an outer bottom edge 6b of the circumferential grooves 5, 5 in the axial direction of tire. The central part 9 is defined as the region between the inner bottom edges 6a, 6a of the circumferential grooves 5, 5 in the axial direction of tire.

The circumferential grooves 5, 5 are positioned, in the embodiment, asymmetrically about the tire's equatorial plane CL, so that a bisectional plane KL dividing the central part 9 in two equal widths in the tire's axial direction is remote from the tire equatorial plane CL. The circumferential grooves 5, 5 have a same groove depth D to each other, and this groove depth D is set in a range of 4 to 6% of a ground-contacting width TW of the tread such as 7.5 to 12.0 mm, preferably 8.2 mm for a tire of 205/55R15 in size.

The central part 9 has a surface with a smooth convex curve composed of a pair of inner groove walls 9A extending inside in the axial direction of tire along a curve convexed outwardly in the radial direction of tire from the inner bottom edges 6a of the grooves 5 and a central ground-contacting surface 9B smoothly connected between the inner groove walls 9A, 9A.

Figure 4:
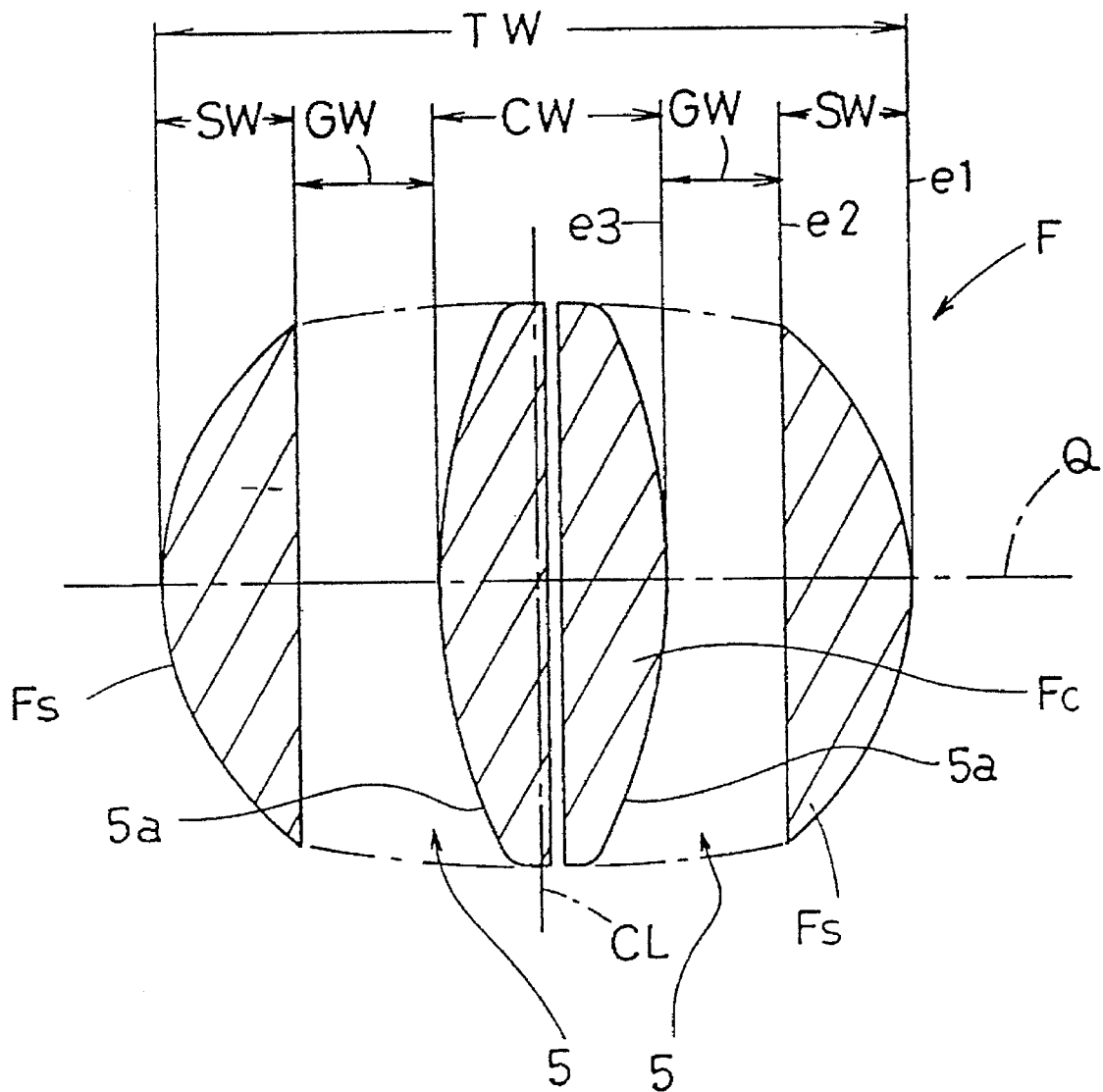
FIG. 4 is a plan view showing a ground-contacting tread area of the tire in FIG. 1 when a normal load is applied.

Incidentally, when a normal load is applied to the tire in the normal state, as shown in FIG. 4, a ground-contacting tread area F where the tread 2 contacts with the ground is obtained. The ground-contacting tread area F has a ground-contacting area Fc of the central part 9 having a thin elliptic form and ground-contacting areas Fs of the shoulder parts 4 having a semicircular form.

Then, the central ground-contacting surface 9B is defined as a part of the tread surface between the circumferential lines e3, e3 passing the axially outer edge of the ground-contacting area Fc. Each of shoulder ground-contacting surfaces 10, 10 is defined as a part of the tread surface between the circumferential lines e1, e2 passing the axially outer and inner edges of the ground-contacting areas Fs.

The ground-contacting tread width TW is defined as an length between the circumferential lines e1, e1. Widths SW of the shoulder ground-contacting areas Fs, that is, widths of the shoulder ground-contacting surfaces 10, 10 are also defined as an length between the circumferential lines e1, e2. Each of the shoulder ground-contacting surfaces 10, 10 is crossed by an outer groove wall 8 extending radially outside from the outer bottom edge 6b of each of the grooves 5, 5, thus, the circumferential grooves 5, 5 are defined by the groove bottom 6 and inner and outer groove wall 9A, 8. Groove widths GW of the circumferential grooves 5, 5 are defined as a length between the circumferential lines e2, e3. And a width CW of the ground-contacting area Fc, that is, a width of the central ground-contacting surface 9B is defined as an length between the circumferential lines e3, e3.

Figure 5A:
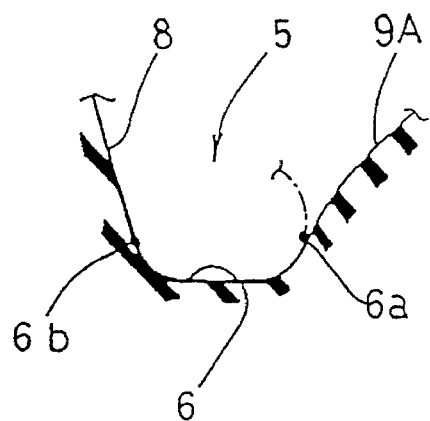
FIG. 5(A) is an enlarged partial sectional view for explanation of groove bottom ends.
Figure 5B:
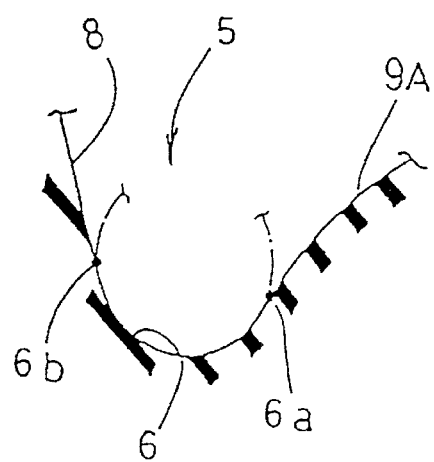
FIG. 5(B) is an enlarged partial sectional view for explanation of groove bottom ends.

The groove bottom edges 6a, 6b may be formed, when the groove bottom 6 is approximately a flat surface as in the embodiment, as bending points between the groove bottom 6 and groove walls 8, 9A. When the groove bottom 6 is a concaved surface as shown in FIGS. 5(A) and 5(B), the groove bottom edges 6a, 6b may be formed as bending points or inflection points.

The central ground-contacting surface 9B is substantially in contacting with a virtual tread line 7 connected between the shoulder ground-contacting surfaces 10, 10.

Here, the expression "substantially in contact" means that a minimum distance between the central ground-contacting surface 9B and the virtual tread line 7 is within 2% of the ground-contacting tread width TW. If it is 2% or more, because the difference between the ground-contacting pressures of the shoulder part and central part is increased, the grip performance is reduced, and the wear resistance is affected. Thus, it should be preferably 1% or less, more preferably 0.5% or less.

Additionally, the virtual tread line 7 is defined as the arcuate curve of a single radius of curvature which extends between the axially inner edges 12, 12 of the shoulder ground-contacting surfaces 10, 10 and is in contact with tangent lines to the shoulder ground-contacting surfaces 10, 10 at the axially inner edges 12 thereof. When the tangent is approximately parallel, the virtual tread line 7 is formed as a straight line connecting between the inner edges 12, 12.

In the invention, the convex central part 9 provides a sub-tread having a radius of curvature which is comparatively small and a width sufficiently narrower than the tire's width in the center of tire, thus, the hydroplaning phenomenon is prevented, and the wet grip performance is increased.

By reducing the radius of curvature of the central part 9, specifically that of the central ground-contacting surface 9B, the water draining performance to outside in both directions is increased, and the water clearing effect on a wet road is enhanced.

Incidentally, in the case where the radius of curvature R2 of the virtual tread line 7 is also reduced, the grip performance on a dry road and steering stability in cornering are reduced due to a reduction of ground contact area. Therefore, the radius of curvature R2 should be comparatively large, preferably 3 or more time the ground-contacting tread width TW. It is also allowable for the shoulder ground-contacting surfaces 10, 10 to be approximately a straight line parallel with the tire's axis. The radius of curvature R2 has its center on the tire equatorial plane CL. The shoulder parts 4, 4 are provided with an arcuate part with a radius of curvature smaller than the radius of curvature R2 in the vicinity of the axially outer edge of the ground-contacting tread area F.

Figure 2:
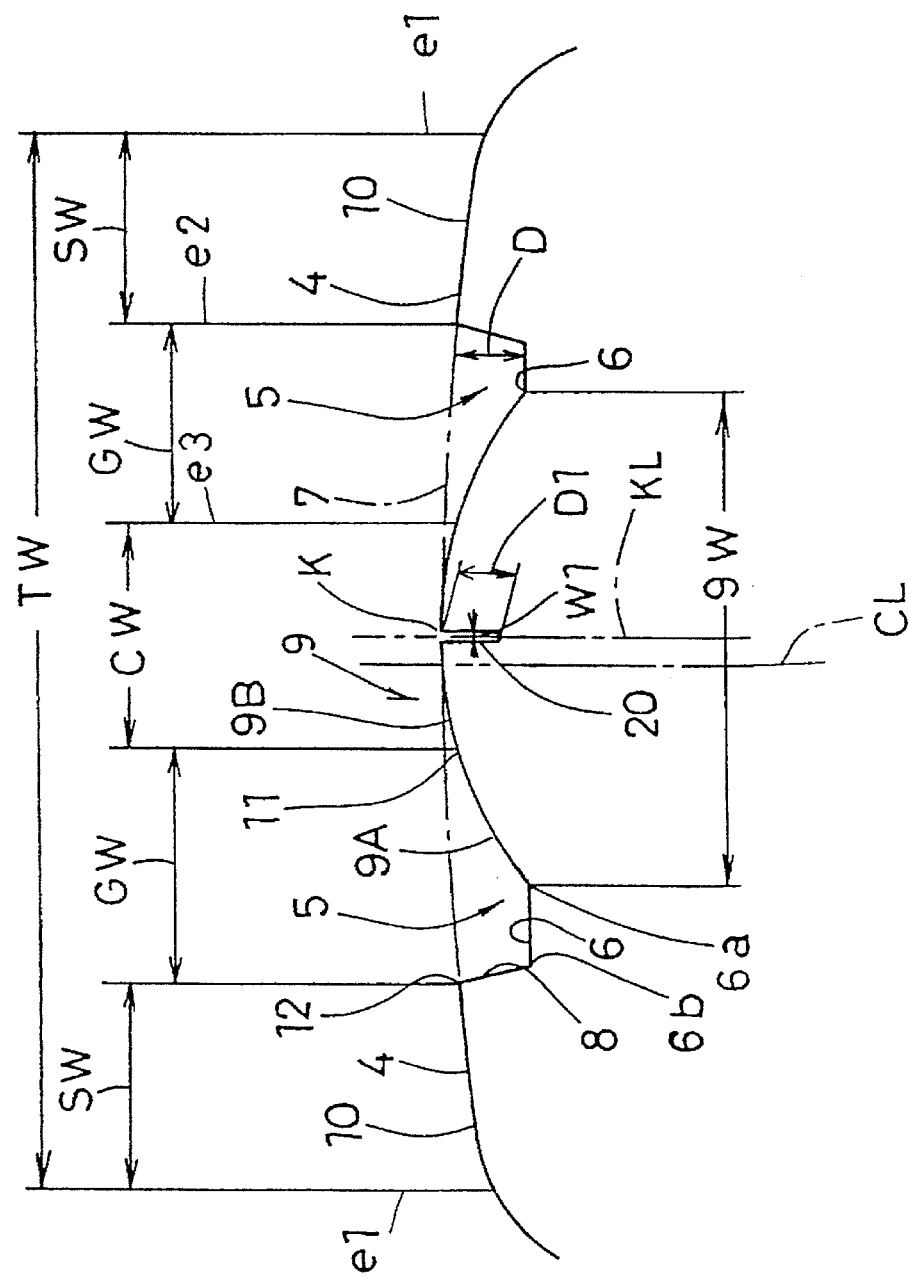
FIG. 2 is a enlarged sectional view showing a central part configuration of the tire in FIG. 1.
Figure 3:
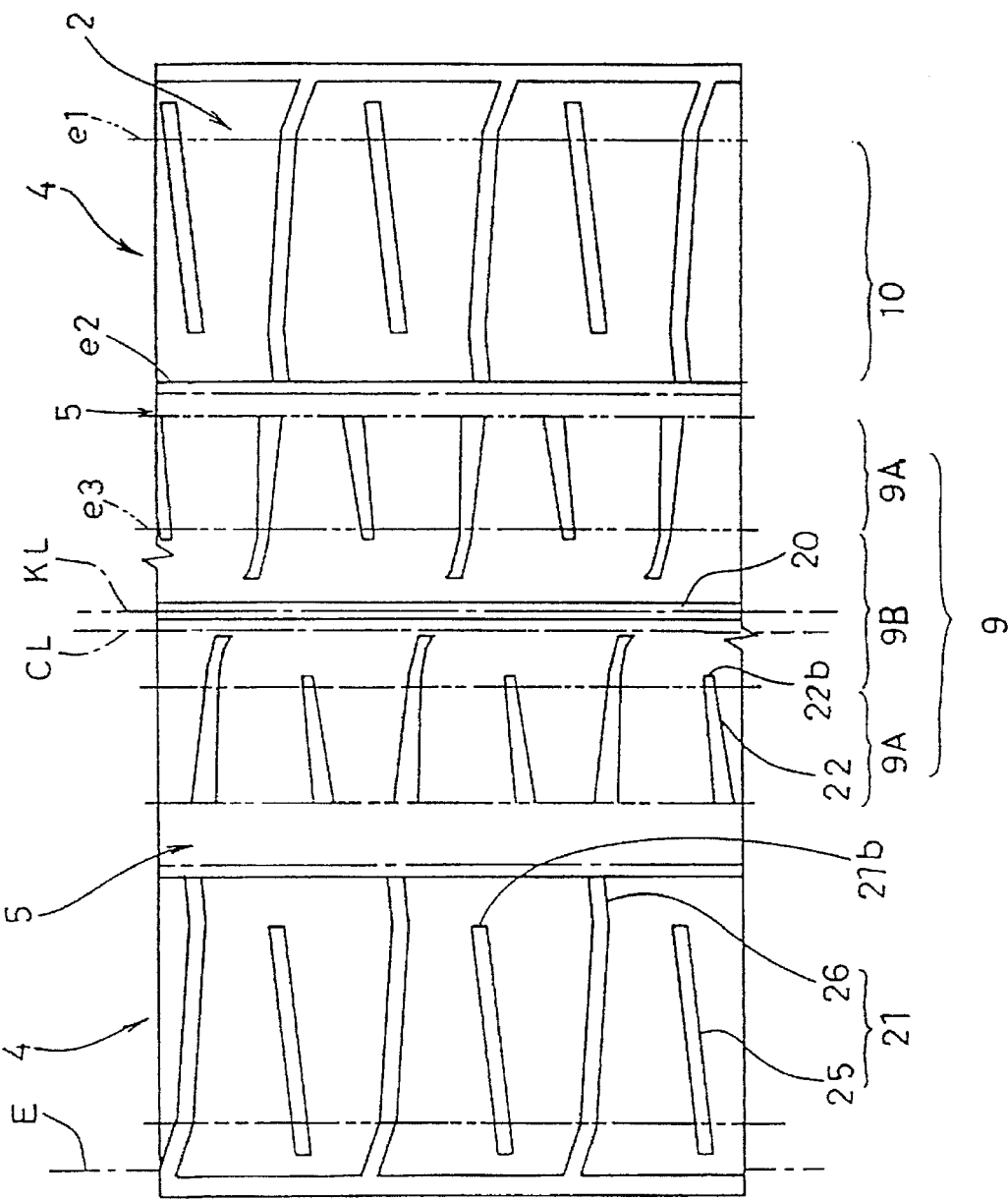
FIG. 3 is a partial flat view showing a tread pattern of the tire in FIG. 1.

FIGS. 1 and 2 show an example wherein all of the surface of the central part 9 is formed by an arc with a single radius of curvature R1 inscribed with the virtual tread line 7. The radius of curvature R1 has its center on the bisectional plane KL of the central part 9, which is parallel with the tire equatorial plane CL and passes at the contact point K between the central part 9 and the virtual tread line 7. A profile of the central part 9 is symmetrical about the bisectional plane KL, but since the bisectional plane KL is remote from the tire equatorial plane CL, the central part 9 becomes asymmetrical about the tire equatorial plane CL.

The radius of curvature R1 is sufficiently smaller than the radius of curvature R2, and preferably in a range of 0.4 to 1.5 times, more preferably 0.45 to 0.55 times the ground-contacting tread width TW. If it is less than 0.4 times. The width CW of the central ground-contacting surface 9B is too reduced, and the dry grip performance tends to be significantly reduced. If it is more than 1.5 times, the draining effect is insufficient, and the wet grip performance is inferior.

In the shoulder parts 4, it is desirable that the outer groove walls 8 of the respective grooves 5, 5 are formed by a relatively steep and non-arcuate line such as a straight line, at an angle α of 0 to 40 degrees, preferably 5 to 25 degrees to a radial line X of tire, so that an edge effect on a road surface is provided at the inner edges e2 of the shoulder parts 4 with a high ground-contacting pressure to help maintain the dry grip performance by increasing lateral force. The outer groove wall 8 may be connected smoothly to the shoulder ground-contacting surface 10 through a convex curve, or the outer groove wall 8 may be formed as a convex curve similar to the inner groove wall 9A.

In the embodiment, the bisectional plane KL of the central portion 9 is deviated to the right side of the tire equatorial plane CL in FIGS. 1 and 2. Also, the axially inner edges 12, 12 of the shoulder ground-contacting surfaces 10, 10 are both apart from the tire equatorial plane CL by an equidistance, so that the shoulder ground-contacting surfaces 10 have a same width SW to each other, and that the groove widths GW of the respective circumferential grooves 5, 5 are different from each other. In the embodiment, since the inner groove walls 9A, 9A are both formed by the same arc, the circumferential grooves 5, 5 differ in the width of the groove bottom 6.

Figure 6:
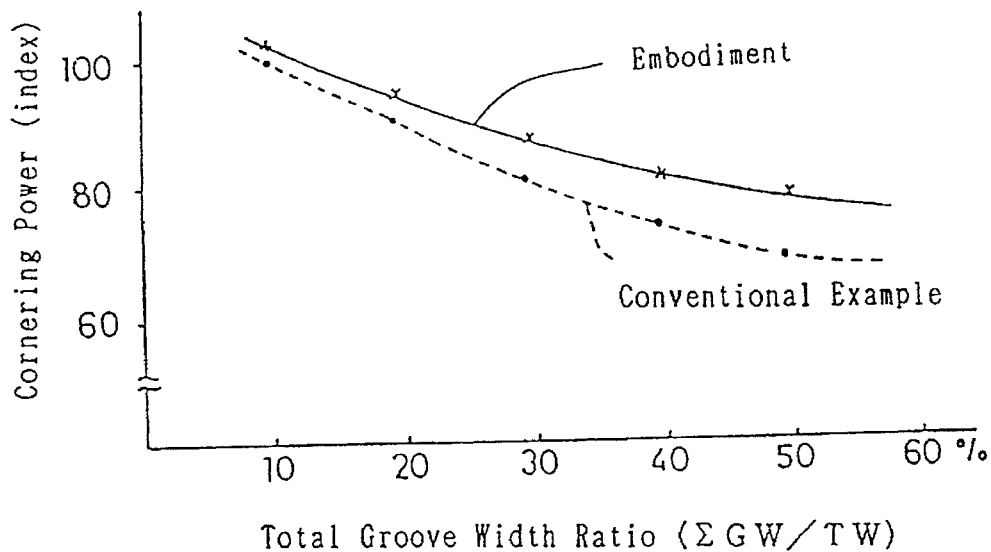
FIG. 6 is a diagram showing the relation between the total groove width ratio and cornering power.
Figure 15:
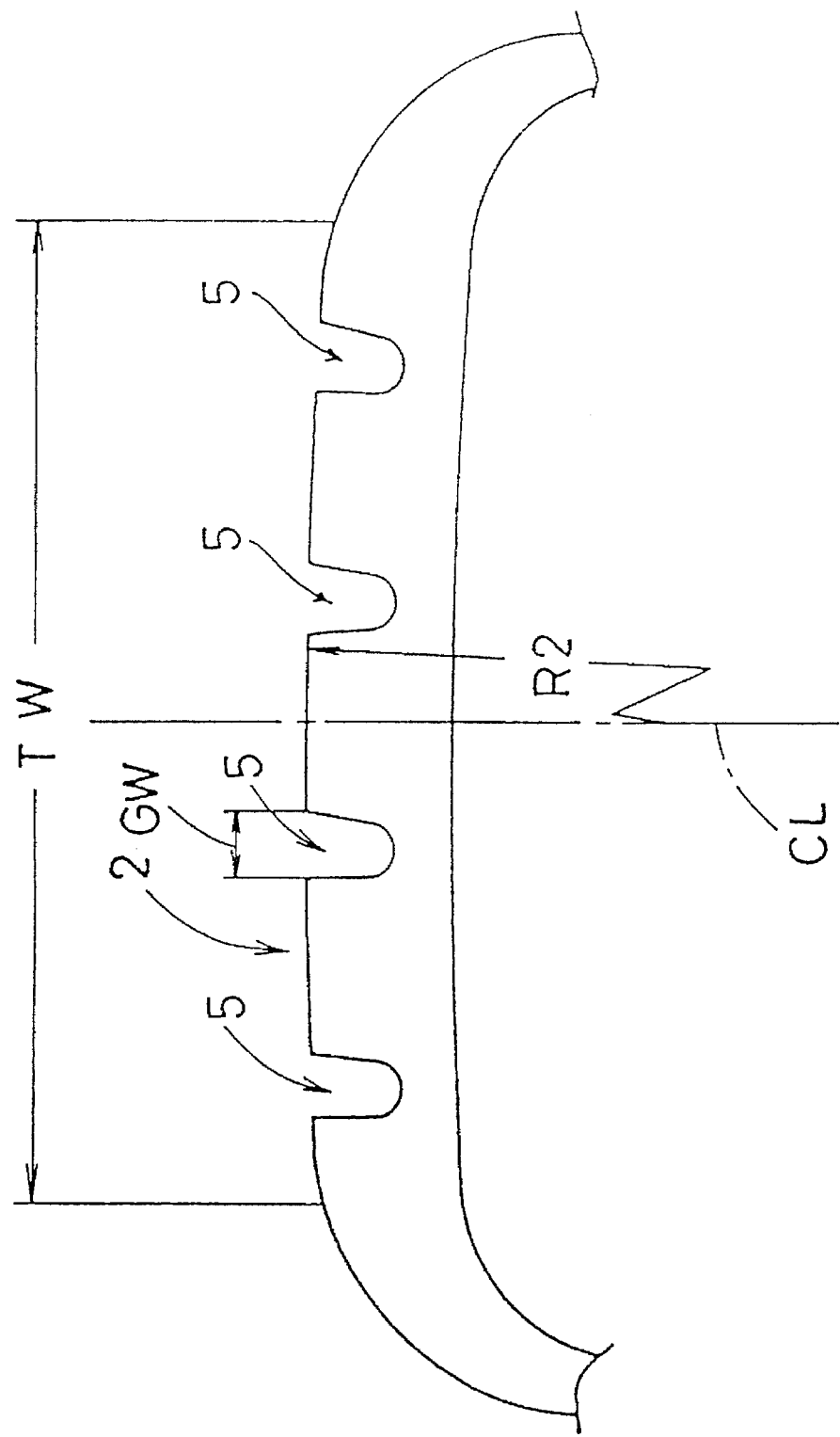
FIG. 15 is a sectional view showing a tread profile of a conventional tire.

Regarding the circumferential grooves 5, 5, it was found that a total groove width ratio 2GW/TW of a total groove width 2GW of the circumferential grooves 5, 5 to the ground-contact tread width TW affects the cornering power and wet grip performance. FIG. 6 shows the result of measuring the cornering power of a tire of 205/55 R15 in size with a central part in a form of a single arc as shown in FIG. 1 and a conventional tire with four circumferential grooves G as shown in FIG. 15 by changing the total groove width ratio ΣGW/TW. For the total groove width ratio, a value of the ratio 2GW/TW was employed for the embodiment, and a value of the ratio (ΣGW)/TW for the conventional example. The cornering power was measured on a drum tester in the normal state. It was shown that the embodiment shows a higher value in comparison with the conventional tire. This is considered to be because, when the total groove width ratio defined as above is constant, the inner groove wall 9A of the convex curve contributes to increasing the tire's lateral rigidity.

Figure 7:
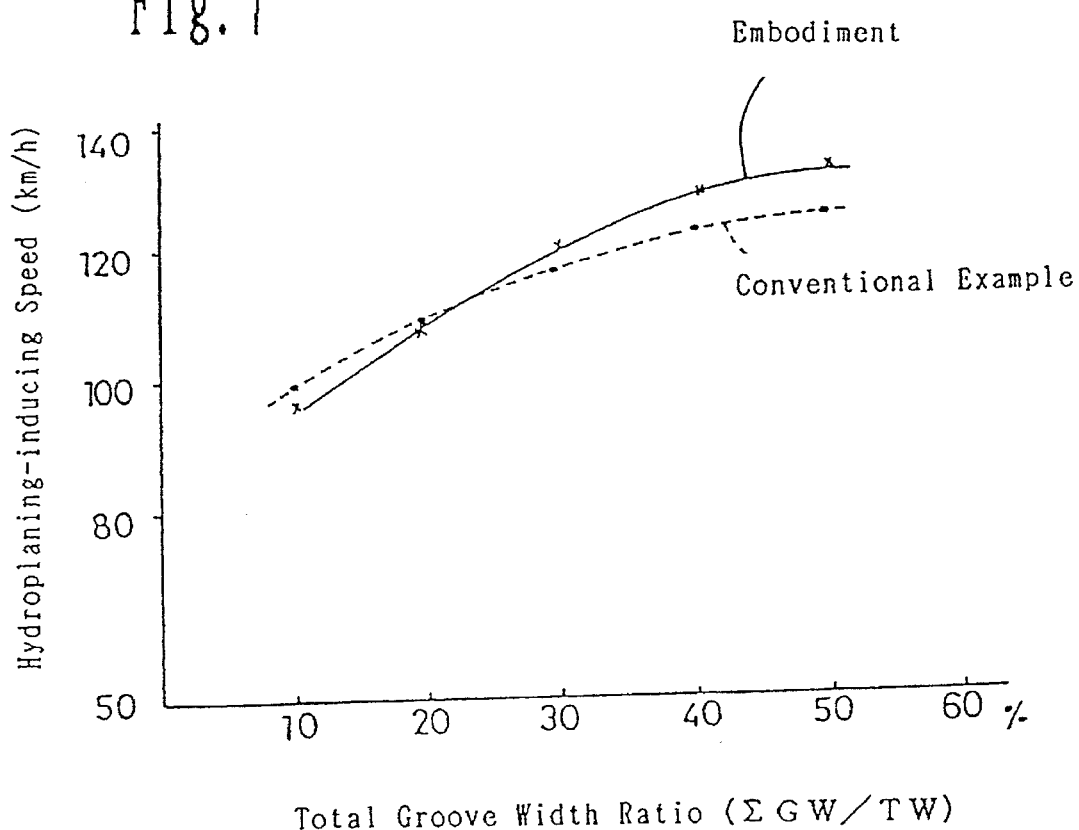
FIG. 7 is a graph showing the relation between the total groove width ratio and hydroplaning-inducing speed.

FIG. 7 shows the result of measuring, in a similar manner, the hydroplaning inducing speed. It was shown that the hydroplaning phenomenon occurred at a higher speed in the embodiment, compared to the conventional tire. This is considered to be because the circumferential grooves 5, 5 form widened parts 5a as shown in FIG. 4 at the front and the back of the ground-contacting center Q, when the tire comes in contact with the ground. The widened part 5a increases the draining performance. Incidentally, in the case where the value of the ratio (ΣGW)/TW exceeds 50%, the increasing of the inhibitory effect of hydroplaning phenomenon is not expected as shown in FIG. 7, and the cornering power becomes insufficient. Therefore, the value of the ratio (ΣGW)/TW is preferably less than 50%, more preferably less than 45%.

Also, the widened part 5a prevents occurrence of the columnar resonance in the circumferential grooves 5, 5, thereby reducing of tire noise.

Figure 8A:
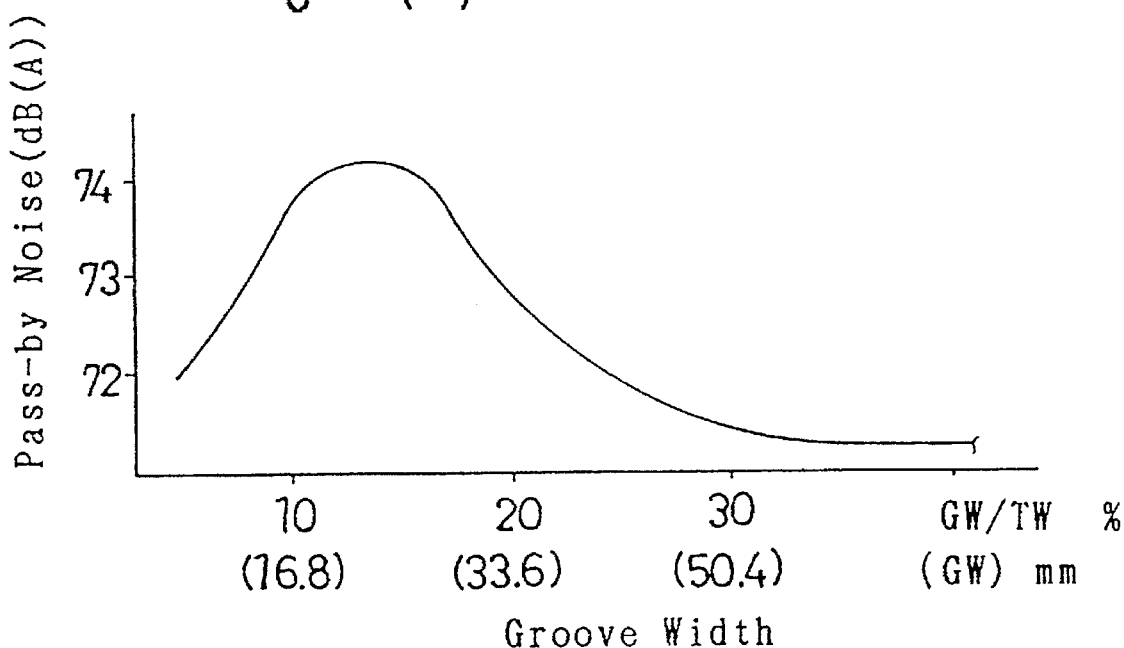
FIG. 8(A) is a graph showing the relation between the groove width and pass-by noise of tire of 205/55R15.
Figure 8B:
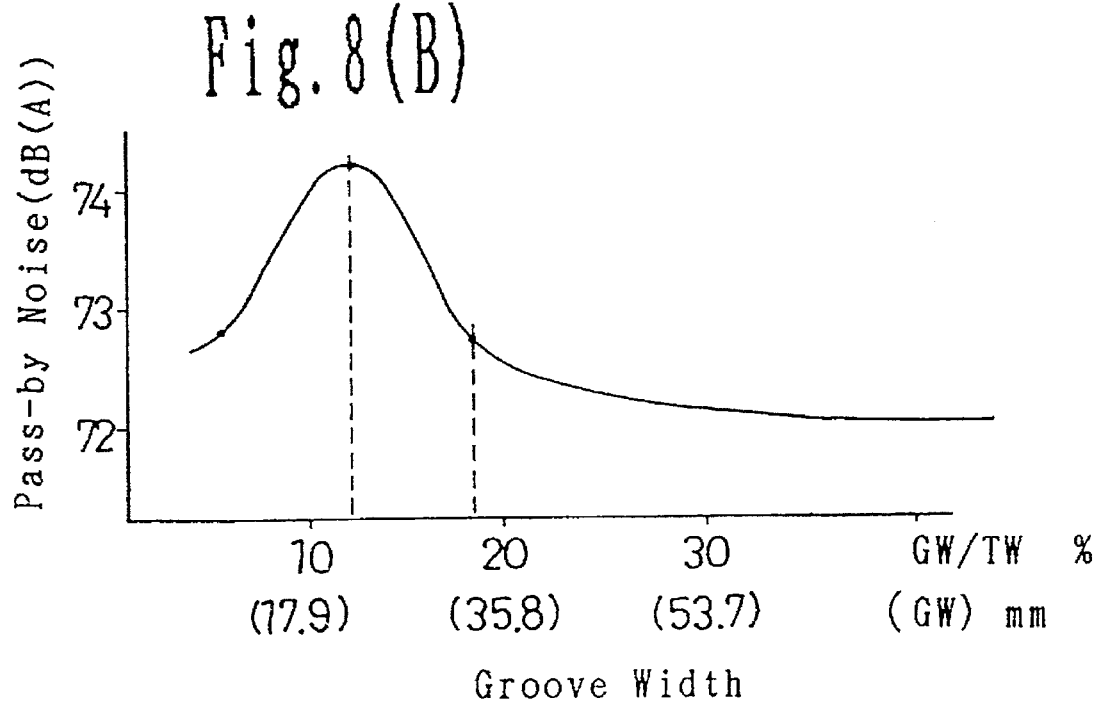
FIG. 8(B) is a graph showing the relation between the groove width and pass-by noise of tire of 225/50R16.

To further enhance the inhibitory effect of air column resonance, the groove widths GW of the respective circumferential grooves 5, 5 must be 35 mm or more, preferably 40 mm or more. At the same time, if the groove widths GW are more than 0.35 times the ground-contact tread width TW, the effects are hardly changed. It is known from the test result in FIGS. 8(A), 8(B) showing the measurement of pass-by noise by varying the groove widths GW at a fixed groove depth of the circumferential grooves 5, 5. In FIGS. 8(A), 8(B), tires of 205/55R15 and 225/50R16 in size are tested respectively. And from FIGS. 8(A), 8(B), it was found that the pass-by noise reaches the peak at the groove width GW of 7.5 to 25 mm, and then drops suddenly, and an excellent low noise characteristic is noted at 35 mm and over.

Nevertheless, although the tire of the invention has a high cornering power as shown in FIG. 6, the increase in the groove widths GW decreases the ground contact area, thereby lowering the dry grip performance and steering stability. In addition, the decrease in the ground contact area deteriorates the abrasion resistance by increasing the ground contact pressure. Therefore, the groove widths GW are limited to not more than 0.35 times the ground-contact tread width TW from the view points of the dry grip performance, steering stability and the abrasion resistance.

Furthermore, in order to prevent the deterioration of the steering stability and dry grip performance due to the increase of the groove width, the central ground-contacting surface 9B is formed asymmetrically about the tire equatorial plane CL by deviating the bisectional plane KL of the central portion 9 from the tire equatorial plane CL.

This is, by installing the tire so as to direct the deviating side of the bisectional plane KL, that is right side of tire in the embodiment, outward of the car, the tread stiffness directed outward of the car is increased, and a strong lateral force can be exhibited, so that the steering stability, in particular, the turning stability can be enhanced. On the other hand, when the tire is installed so as to direct the deviating side of the bisectional plane KL inward of the car, high cornering force is not generated and asymmetric property becomes excessive, so that the steering stability tends to be significantly reduced.

Incidentally, to maintain the dry grip performance, wear resistance and steering stability, the width CW of the central ground-contacting surface 9B is preferably set about 5 to 40% of the ground-contacting tread width TW, or more preferably 15 to 35%. A width 9W of the central part 9, or the distance between the inner groove bottom edges 6a, 6a is preferably set about 40 to 55% of the ground-contacting tread width TW.

Figure 12:
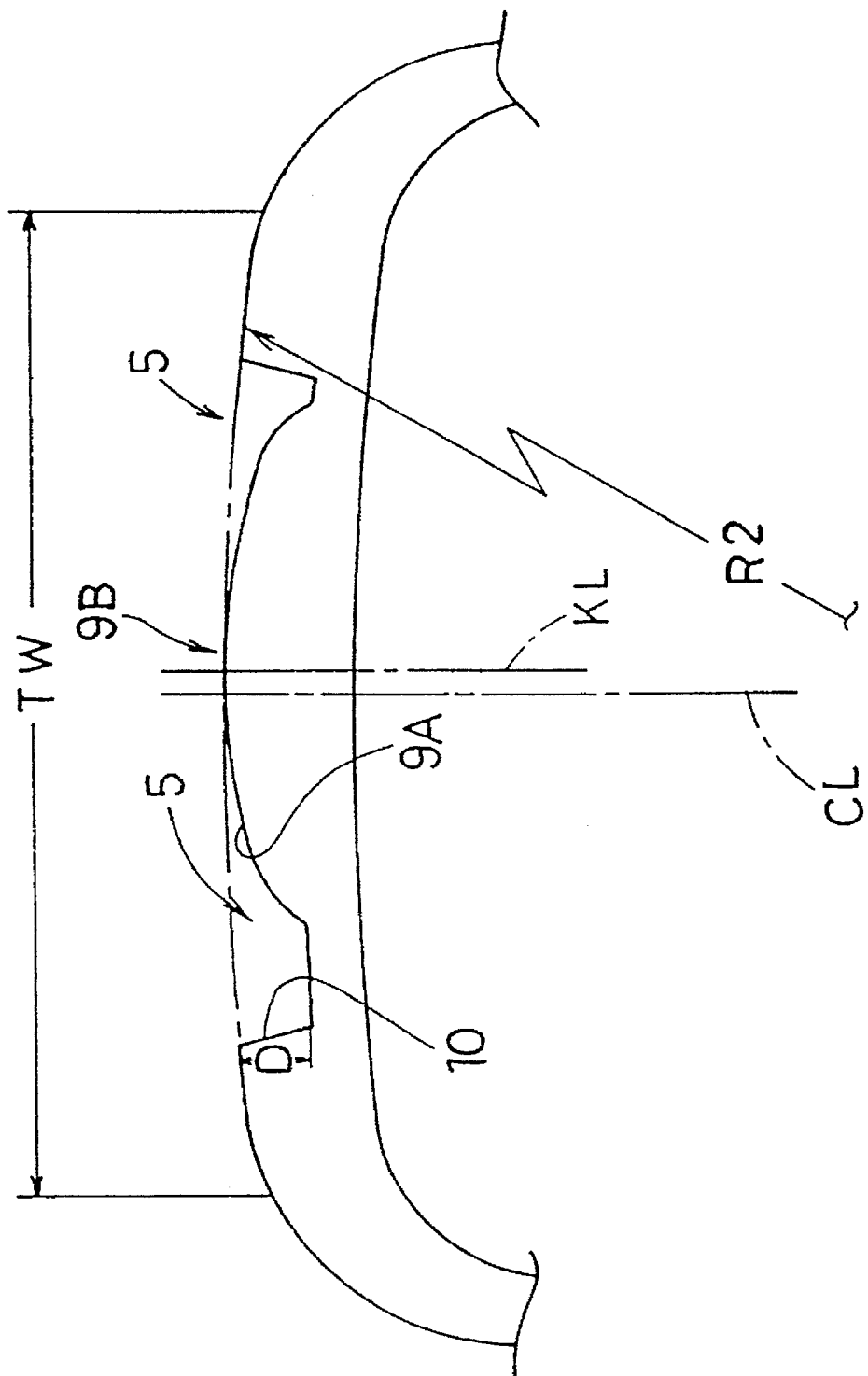
FIG. 12 is an enlarged sectional view showing yet another example of a central part configuration.

Meanwhile, as shown in FIG. 12, the surface of the central part 9 may be formed in an elliptic shape or a curve approximate to an ellipse.

Each of the widths SW of the respective shoulder ground-contacting surfaces 10, 10 is preferred to be 0.09 times or more the ground-contacting tread width TW, for example, 15 mm or more in the tire size 205/55R15. If smaller than 0.09 times, the ground contacting pressure of the shoulder ground-contacting surfaces 10, 10 increases unevenly, and an uneven wear occurs.

In the embodiment, the central part 9 is provided with a circumferential narrow groove 20 continuously extending on the central ground-contacting surface 9B, for example on the bisectional plane KL. The circumferential narrow groove 20 has a groove width W1 of 1.5 to 7 mm and a groove depth D1 of 0.4 to 0.9 times the groove depth D of the circumferential grooves 5, 5. The circumferential narrow groove 20 further increases the water draining performance of the central part 9 so as to improve the wet grip performance, and provides a heat radiation effect, while maintaining the high pattern rigidity and low noise characteristic. If the groove width W1 is more than 7.5 mm, and the groove depth D1 is more than 0.9 times the groove depth D, then columnar resonance is caused. If the groove depth D1 is less than 0.4 times the groove depth D, the heat radiation effect is insufficient.

In embodiment, also, the lateral grooves 21 and 22 are provided on the shoulder parts 4 and the central part 9, respectively. The lateral grooves 21 comprise grooves 25 which are terminated at both ends before the circumferential grooves 5, 5 and the tread ends E, E and grooves 26 which cross the shoulder parts 4 and connect to the respective circumferential grooves 5, 5 and the respective tread ends E, E. The grooves 25 and the grooves 26 are arranged alternately, so that a drop of the rigidity in the shoulder part 4 is prevented and that wet grip performance is improved. The lateral grooves 22 extend from a position of their inner ends spaced from the bisectional plane KL, and outer ends thereof are connected to the circumferential grooves 5, 5. Thus, because the lateral groove 22 is spaced from the bisectional plane KL, the rigidity in the central part 9 is maintained, and the steering stability is assured. In the lateral grooves 21, 22, groove bottoms and inner end walls 21b, 22b are substantially parallel to the belt layer 17 and the tire equatorial plane CL, respectively. Also, groove walls thereof are inclined at an angle of 15 degrees or less to a radial line of tire, so that a dimensional change of the lateral grooves 21, 22 due to wear of the tire is controlled and a drop of the wet grip performance is prevented. Incidentally, such other factors as the circumferential groove pitch and the groove depth of the lateral grooves 20, 21 are selected according to the required purpose.

Hereinafter, the circumferential grooves 5, 5 and inner groove walls 9A, 9A are referred to as 51, 52 and 91A, 92A respectively when distinguishing the right and left. Also, the groove widths GW, GW and the widths SW, SW of the shoulder ground-contacting surface are referred to as GW1, GW2 and SW1, SW2 respectively when distinguishing the right and left.

Figure 10:
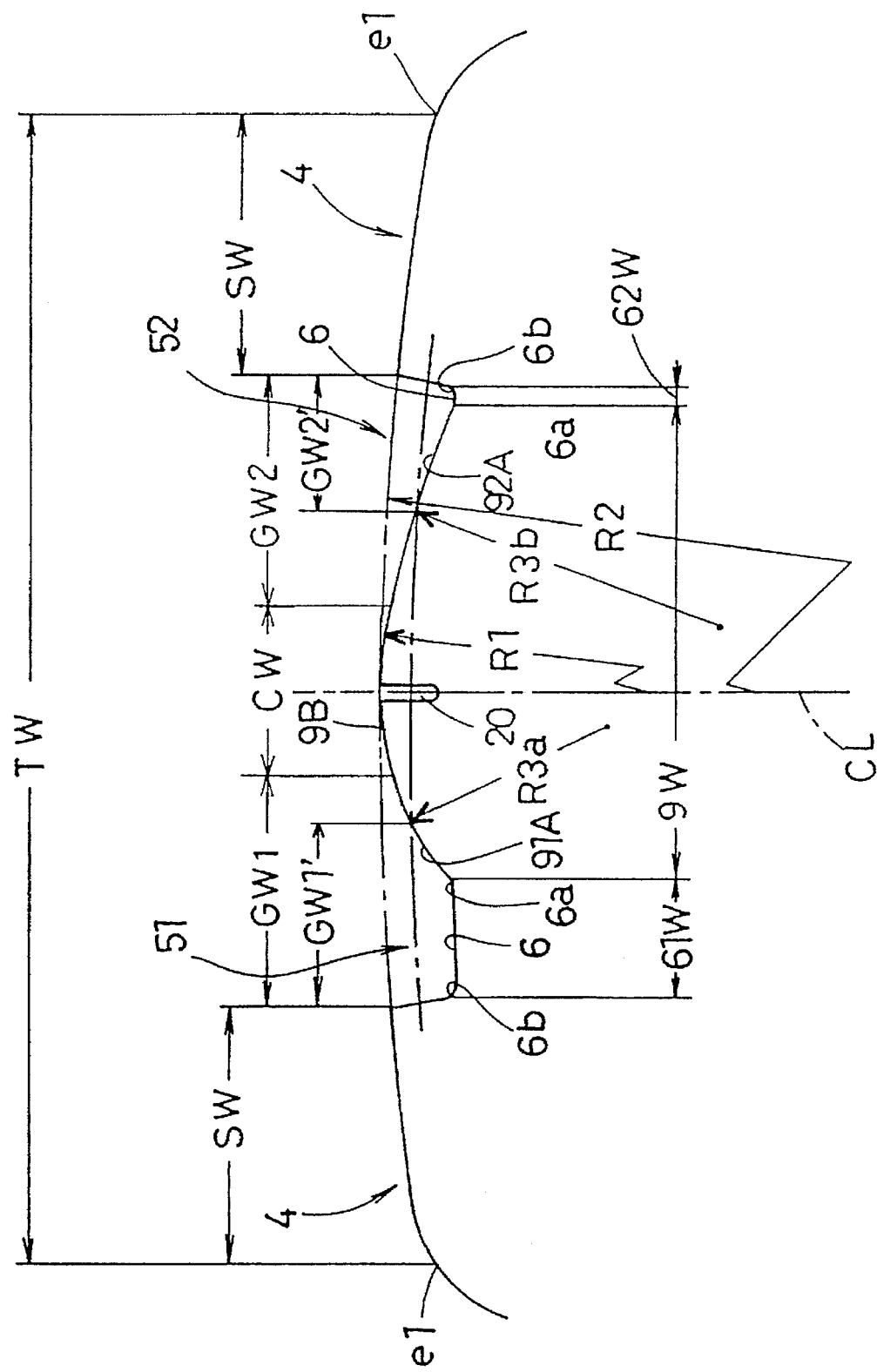
FIG. 10 is an enlarged sectional view showing a central part configuration of the tire in FIG. 9.
Figure 16A:
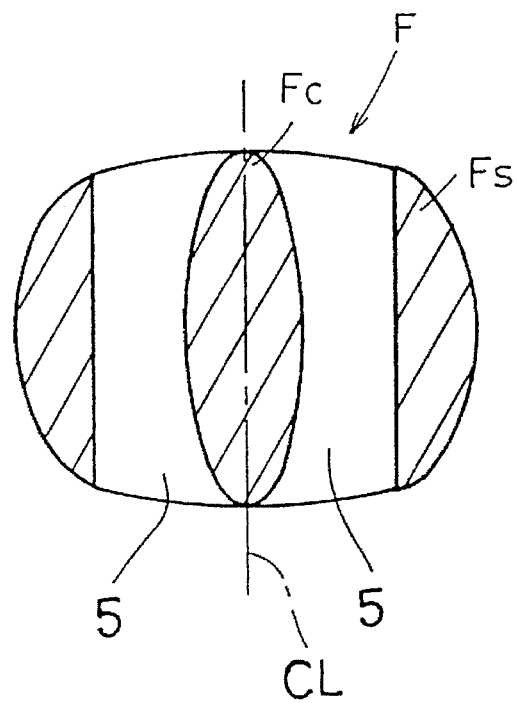
FIG. 16(A) is a plan view showing a ground-contacting tread area of the tire of FIG. 9 and 10 in straight running.

FIGS. 9, 10 show another example of the central part 9 which is asymmetrical about the tire equatorial plane CL because of deviating the bisectional plane KL from the tire equatorial plane CL. In the central part 9, the central ground-contacting surface 9B with the radius of curvature R1 is symmetrical about the tire equatorial plane CL, but profiles of the inner groove walls 91A, 92A are different from each other. In this case, the inner groove wall 91A are formed by an arc with a radius of curvature R3a, the inner groove wall 92A is formed by an arc with a radius of curvature R3b larger than the radius of curvatures R1 and R3a, the widths SW1, SW2 of the shoulder ground-contacting surfaces 10, 10 are equal, and the groove bottom widths 61W, 62W measured between the inner and outer edges 6a, 6b are different to each other, so that the groove width GW1 is set to be coincident with the groove width GW2 at early stage of tire wear. Therefore, as shown in FIG. 16(A), the ground-contacting area F of the tread is symmetrical about the tire equatorial plane CL at early stage of tire wear. In this case, the tire should be installed so as to direct the groove wall 92A toward the outside of the car body.

Figure 18A:
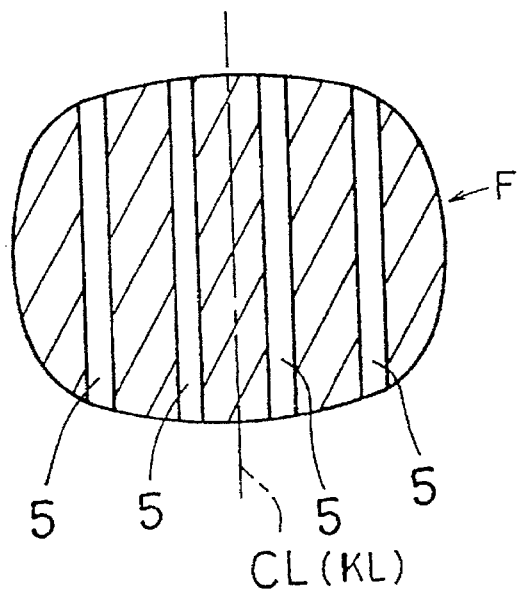
FIG. 18(A) is a plan view showing a ground-contacting tread area of the tire of FIG. 15 in straight running.
Figure 18B:
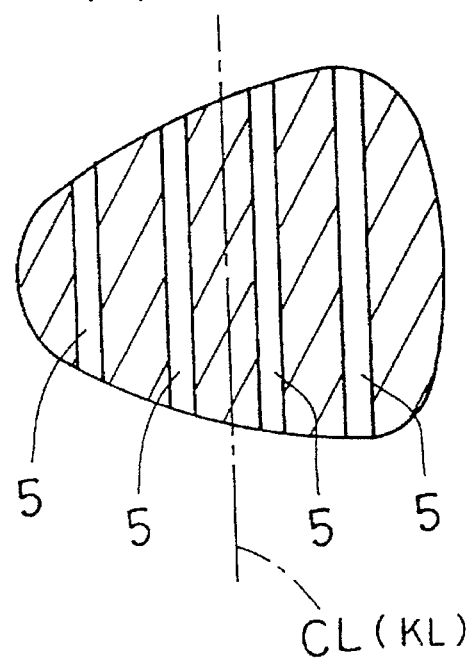
FIG. 18(B) is a plan view showing a ground-contacting tread area of the tire of FIG. 15 in cornering.

When the lateral force works on the conventional tire in cornering, the ground-contacting area F of the tread changes remarkably from FIG. 18(A) to FIG. 18(B). Then, sum of the ground contact area in cornering tends to be rather smaller than that in straight running.

On the other hand, an embodiment tire having a tread profile of FIGS. 1, 2 prevents the reduction of sum of the ground contact area from straight running to cornering as shown in FIGS. 17 (A), 17(B), and is superior to the conventional tire having a tread profile of FIG. 12 in cornering power generated on the drum tester. Then, the embodiment tire exhibits the steering stability equal to or higher than the conventional tire having a relatively lower value of the total groove width ΣGW.

Figure 16B:
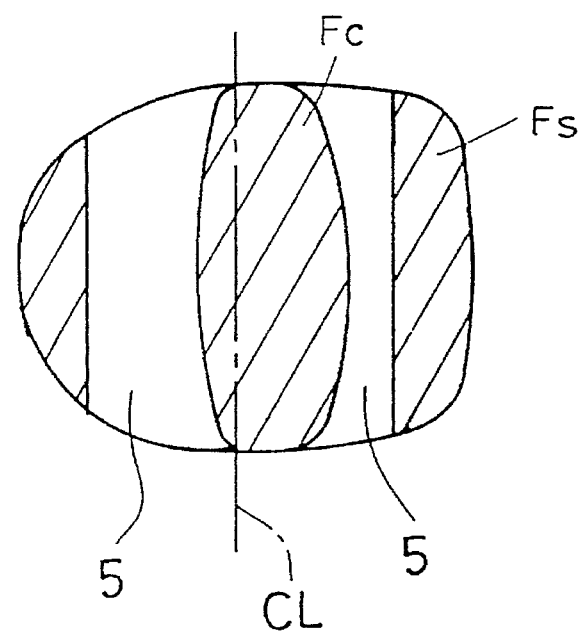
FIG. 16(B) is a plan view showing a ground-contacting tread area of the tire of FIG. 9 and 10 in cornering.

In an embodiment tire having a tread profile of FIGS. 9, 10, the radius of curvature R3b of the groove wall 92A directed toward the outside of the car body is set to be larger than the radius of curvature R1 of the central ground-contacting surface 9B. As the result, the ground contact area Fc of the central ground-contacting surface 9B rather increases smoothly as the lateral force increases in cornering as shown in FIGS. 16(A), 16(B), thereby improving the marginal grip performance in addition to high steering stability.

On the other hand, when the groove bottom width 62W becomes narrower by increasing the radius of curvature R3b, there are cases where, since the groove width GW2 as well as groove depth decreases in accordance with the proceeding of tread wear, the deterioration of the hydroplaning resistance becomes remarkable. To prevent such the deterioration, in the embodiment, the radius of curvature R3a of the groove wall 91A directed toward the inside of the car body is set to be smaller so as to maintain the total of the groove widths GW1', GW2' in the middle stage of the tread wear, thereby securing the hydroplaning resistance at same level as that of the tire having a central portion 9 with a single radius R1.

Figure 11:
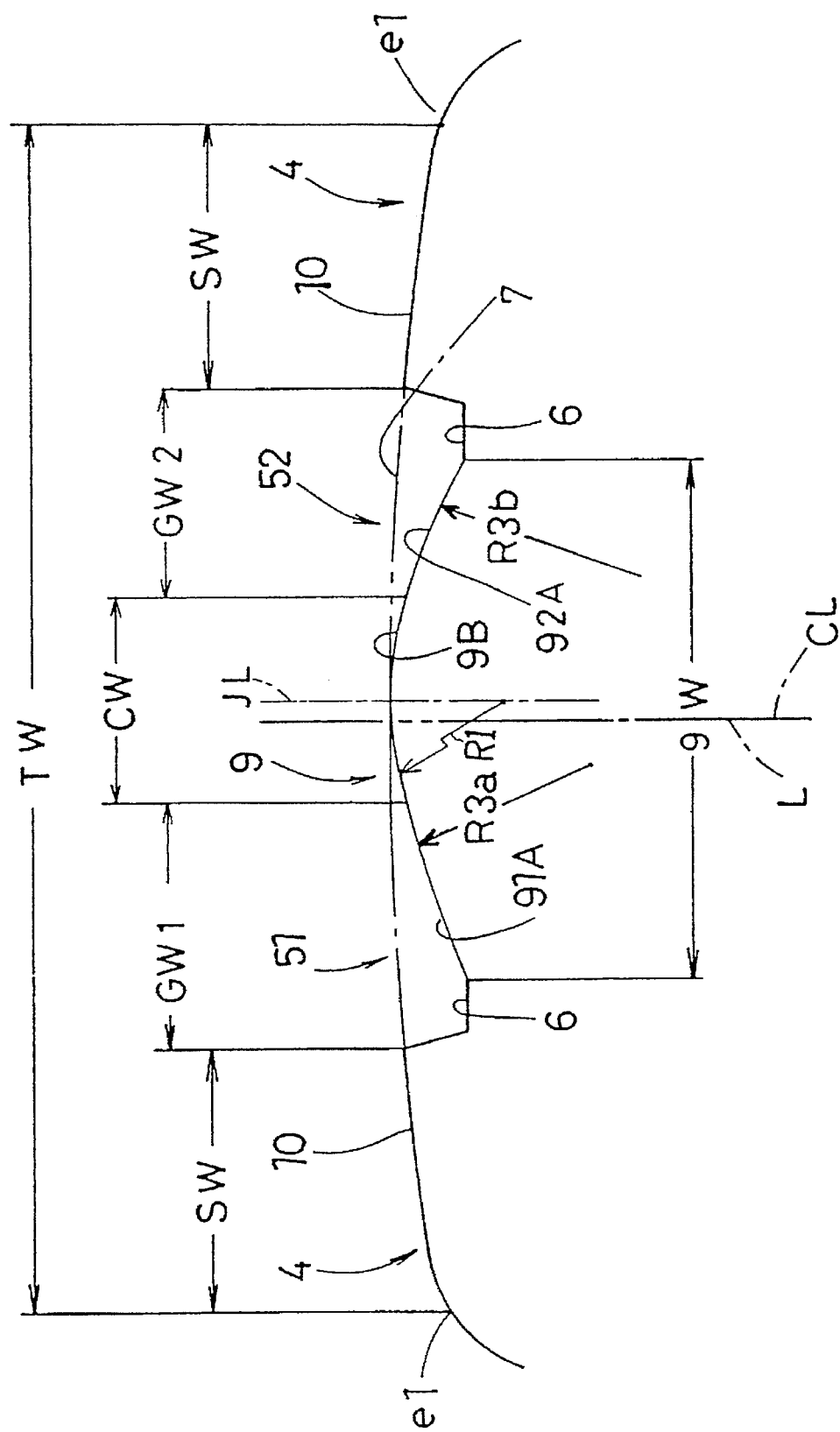
FIG. 11 is an enlarged sectional view showing still another example of a central part configuration.

FIG. 11 shows an example of the central part 9 wherein a bisectional plane KL is coincident with the tire equatorial plane CL. In this case, by changing at least the respective profiles of the inner groove walls 91A, 92A to each other, the profile of the central part 9 becomes asymmetrical about the tire equatorial plane CL. The central part 9 has the inner groove walls 91A, 92A, of which radii of curvature R3a, R3b are different to each other, and the central ground-contacting surface 9B being symmetrical about the center plane JL thereof apart from the tire equatorial plane CL. The center plane JL is the plane bisecting the central ground-contacting surface 9B in the tire axial direction, then, the central ground-contacting surface 9B, the profile of the central part 9 may become asymmetrical about the tire equatorial plane CL.

EXAMPLE

A tire of 205/55R15 in size was produced according to specifications shown in Table 1, and measured for the pass-by noise, cornering power and a hydroplaning-inducing speed. The results of the measurement were compared and shown in the table. The tires were tested and measured in the state mounted on its regular rim R and inflated with regular internal pressure.

TABLE 1

Figure 17A:
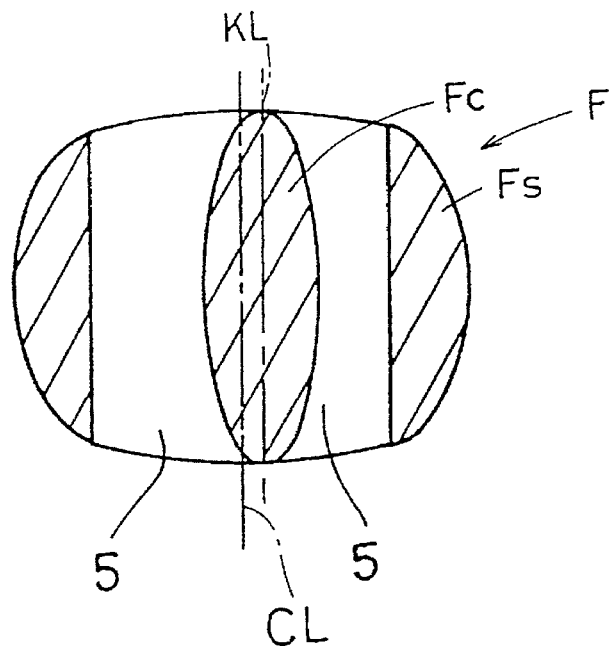
FIG. 17(A) is a plan view showing a ground-contacting tread area of the tire of FIG. 1 and 2 in straight running.
Figure 17B:
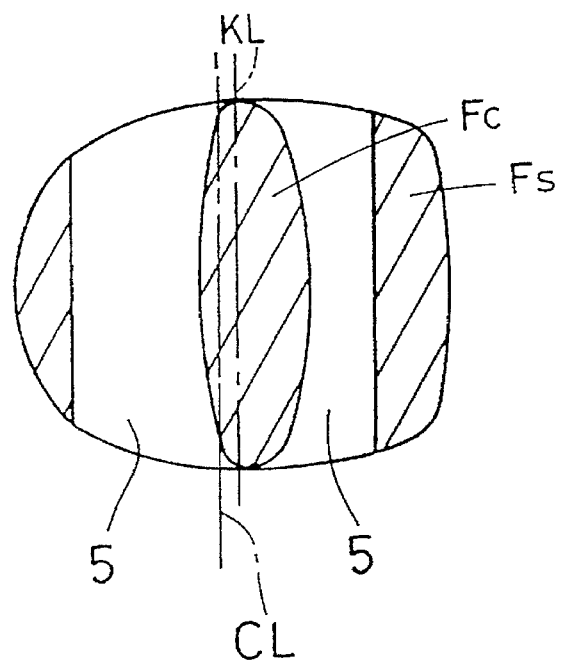
FIG. 17(B) is a plan view showing a ground-contacting tread area of the tire of FIG. 1 and 2 in cornering.
Figure 19:
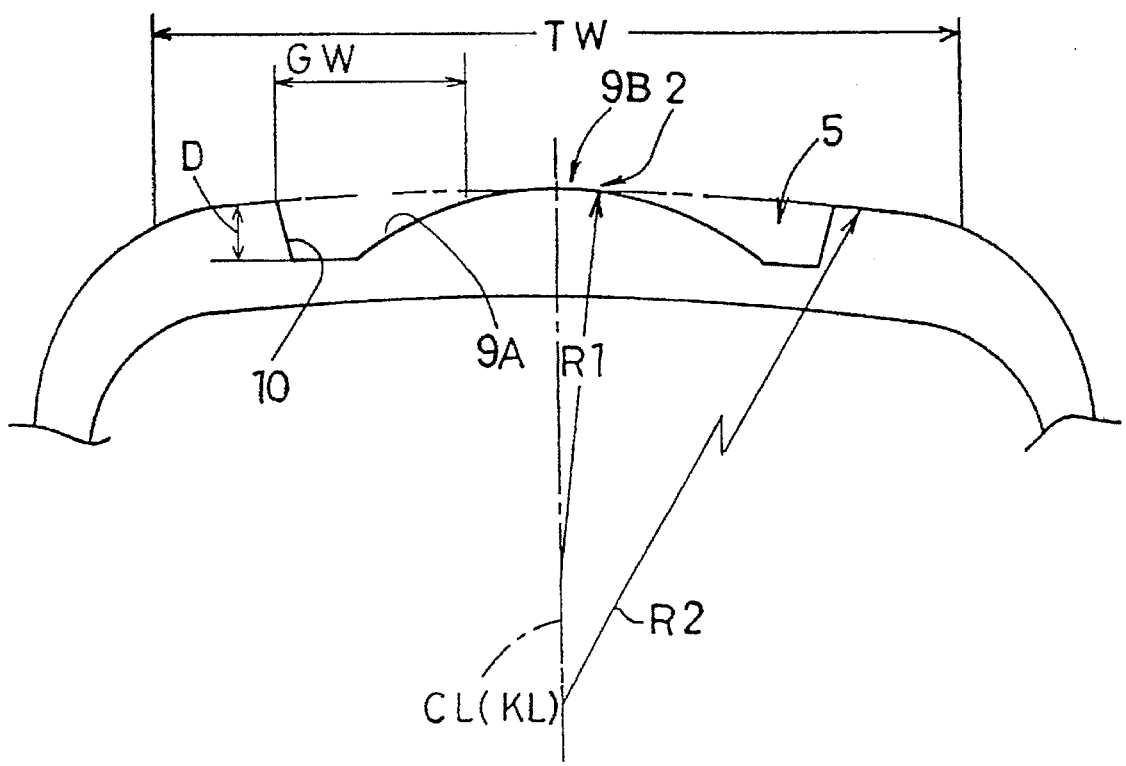
FIG. 19 is a sectional view showing a tread profile of a comparative tire in Table 1.

| | Embodiment 1 | Embodiment 2 | Comparison 1 | Comparison 2 | Comparison 3 |
|---|---|---|---|---|---|
| Tread Profile | FIG. 1, 2 | FIG. 9 | FIG. 15 | FIG. 15 4 | FIG. 19 2 |
| Circumferential Groove; | | | | | |
| Number | 2 | 2 | 4 | 4 | 2 |
| Groove Width (GW1) mm | 35 | 40 | 9 × 2 | 20 × 4 | 40 |
| Groove Width (GW2) mm | 45 | 40 | 9.5 × 2 | | 40 |
| Groove Depth (D) mm | 8.2 | 8.2 | 8.2 | 8.2 | 8.2 |
| Radius (R1) of the Central Surface mm | 80 | 80 | — | — | 80 |
| Radius (R3a) of Groove Wall mm | — | 40 | — | — | — |
| Radius (R3b) of Groove Wall mm | — | 1000 | — | — | — |
| Radius (R2) of Virtual Tread Line mm | 520 | 520 | 520 | 520 | 520 |
| Foot Print of Ground-Contacting Tread Area; | | | | | |
| at 0 degree of Camber angle | FIG. 17(A) | FIG. 16(A) | FIG. 18(A) | — | — |
| at 3 degrees of Camber angle | FIG. 17(B) | FIG. 16(B) | FIG. 18(B) | — | — |
| Change of Ground Contact Area by increasing Camber angle | | Increase the central ground contact area Fc. | Decrease the total ground contact area F. | — | Keep the total ground contact area F equally or highly, and substantially not change the shape of the central ground contact area Fc. |
| Deviated Amount between Planes PL, CL mm At the 50% Height Position of Groove Depth (D); | 5 | 0 | — | — | 0 |
| Goove width (GW1') mm | — | 29 | — | — | 26 |
| Goove width (GW2') mm | — | 21 | — | — | 26 |
| Ratio (GW2'/GW1') | — | 0.72 | — | — | 1.0 |
| Pass-by Noise (dB(A)) *1) | −2.4 | −2.9 | 1 (73.8 dBA) | +1.7 | −2.6 |
| Cornering Power *2) | 92 | 95 | 100 | 80 | 88 |
| Maximum cornering Force *3) | 98 | 100 | 100 | 83 | 95 |
| Hydroplaning-Inducing Speed *3) | 145 | 143 | 100 | 135 | 146 |

Figure 13:
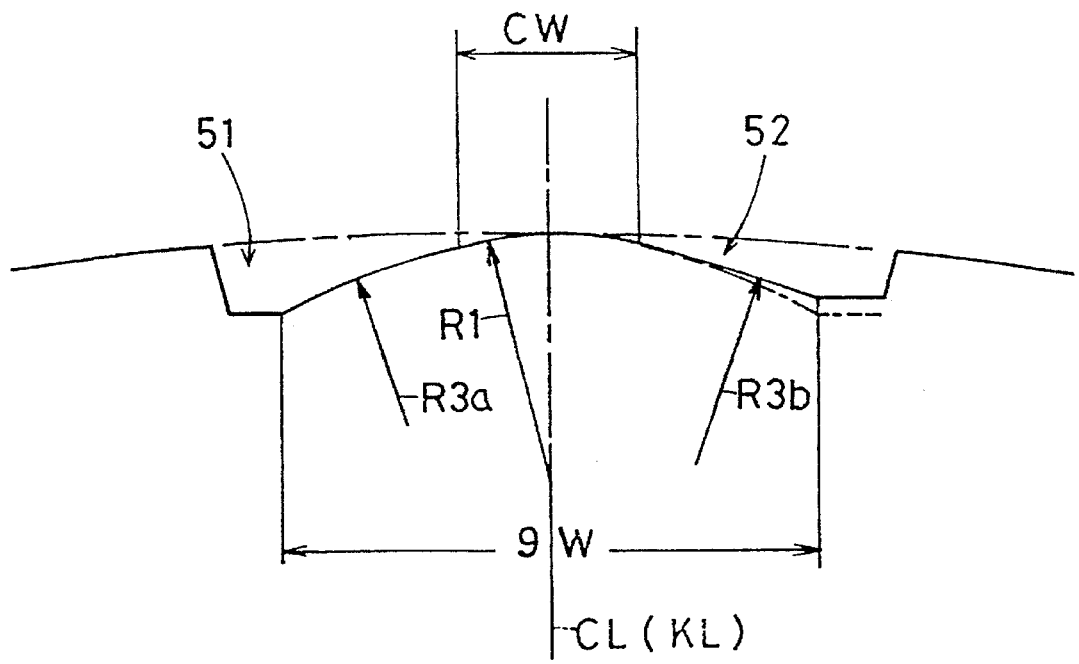
FIG. 13 is an enlarged sectional view showing still another example of a central part configuration.

*1) Rise of fall of the noise level comparative to the comparison 1. (−) mans fall of the noise level.
*2) Indicated as the index with the comparison 1 taken as 100. The smaller figure means the smaller value of the cornering power.
*3) Indicated as the index with the comparison 1 taken as 100. The greater figure means the better performance.

center plane JL may be coincident with the tire equatorial plane CL, as shown in FIG. 13. The embodiment tires with the tread profile of FIG. 13 as well as FIGS. 9, 10, 11 exhibit such the performance that the ground contact area Fc rather increases smoothly as the lateral force increases in cornering so as to improve the marginal grip performance and cornering stability.

Figure 14:
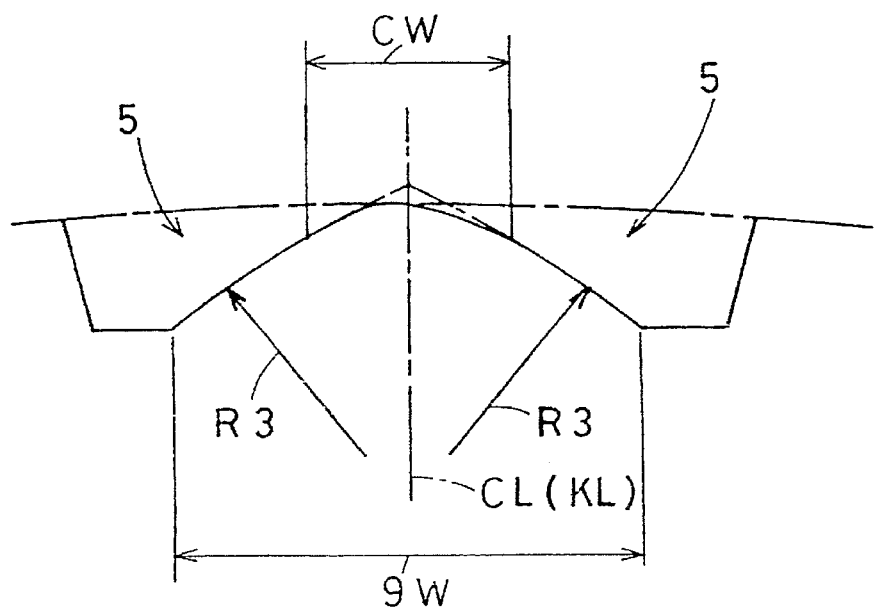
FIG. 14 is an enlarged sectional view showing yet another example of a central part configuration.

In the invention, the central ground-contacting surface 9B is preferably symmetrical about its own center plane JL, in view of running stability. But the central ground-contacting surface 9B may be asymmetrical about its own center plane JL, as shown in FIG. 14, and by this asymmetric property of

What is claimed is:
1. A pneumatic tire comprising a tread part having two circumferential grooves continuously extending in the circumferential direction, one of said circumferential grooves being on one side of the tire's equator and the other circumferential groove being on the other side of the tire's equator so as to divide the tread part into a pair of shoulder parts, which are located outside outer bottom edges of the circumferential grooves in the axial direction of tire, and a central part, which is located between inner bottom edges of the circumferential grooves in the axial direction of tire; wherein the central part has a surface comprising successive convex curves composed of a pair of inner groove walls extending inside, in the axial direction of tire, along a curve convex outwardly in the radial direction from the inner bottom edges of the circumferential grooves, and a central ground-contacting surface smoothly connected between the pair of the inner groove walls, the surface of the central part is asymmetrical about the tire equatorial plane CL, the central ground-contacting surface is substantially in contact with a virtual tread line between outer surfaces of the shoulder parts and is symmetrical about the tire equatorial plane CL, and when the tire is mounted a regular rim, inflated with regular internal pressure and applied with normal load, the circumferential grooves have a groove width GW being not less than 35 mm and not more than 0.35 times a ground-contacting width TW of the tread part.

2. The pneumatic tire according to claim 1, wherein a bisectional plane KL dividing the central part in two equal widths in the axial direction of tire is coincident with the tire equatorial plane CL.

3. The pneumatic tire according to claim 2, wherein the groove widths GW of the two circumferential grooves are different from each other.

4. The pneumatic tire according to claim 2, wherein the shoulder parts are equal in the ground-contacting width SW in the tire's axial direction of the shoulder parts.

5. The pneumatic tire according to claim 1, wherein the groove widths GW of the two circumferential grooves are different from each other.

6. The pneumatic tire according to claim 1, wherein the shoulder parts are equal in the ground-contacting width SW in the tire's axial direction of the shoulder parts.

7. A pneumatic tire comprising a tread part having two circumferential grooves continuously extending in the circumferential direction, one of said circumferential grooves being on one side of the tire's equator and the other circumferential groove being on the other side of the tire's equator so as to divide the tread part into a pair of shoulder parts, which are located outside outer bottom edges of the circumferential grooves in the axial direction of tire, and a central part, which is located between inner bottom edges of the circumferential grooves in the axial direction of tire; wherein the central part has a surface comprising successive convex curves composed of a pair of inner groove walls extending inside, in the axial direction of tire, along a curve convex outwardly in the radial direction from the inner bottom edges of the circumferential grooves, and a central ground-contacting surface smoothly connected between the pair of the inner groove walls, the surface of the central part is asymmetrical about the tire equatorial plane CL, a bisectional plane KL dividing the central part in two equal widths in the axial direction of tire is remote from the tire equatorial plane CL, the central ground-contacting surface is substantially in contact with a virtual tread line between outer surfaces of the shoulder parts and is symmetrical about the tire equatorial plane CL, and when the tire is mounted on a regular rim, inflated with regular internal pressure and applied with normal load, the circumferential grooves have a groove width GW being not less than 35 mm and not more than 0.35 times a ground-contacting width TW of the tread part.

8. The pneumatic tire according to claim 7, wherein the groove widths GW of the two circumferential grooves are different from each other.

9. The pneumatic tire according to claim 7, wherein the shoulder parts are equal in the ground-contacting width SW in the tire's axial direction of the shoulder part.

* * * * *